(12) United States Patent
Hu

(10) Patent No.: US 10,415,632 B2
(45) Date of Patent: Sep. 17, 2019

(54) BEARING FOR VEHICLE SUSPENSION

(71) Applicant: Zhejiang CFMOTO Power Co., Ltd., Hangzhou, Zhejiang (CN)

(72) Inventor: Xiayang Hu, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 0 days.

(21) Appl. No.: 15/891,622

(22) Filed: Feb. 8, 2018

(65) Prior Publication Data

US 2018/0245622 A1 Aug. 30, 2018

(30) Foreign Application Priority Data

Feb. 24, 2017 (CN) .................... 2017 2 0174952 U

(51) Int. Cl.
*F16C 11/04* (2006.01)
*F16C 33/74* (2006.01)
(Continued)

(52) U.S. Cl.
CPC .............. *F16C 11/045* (2013.01); *B60G 3/14* (2013.01); *B60G 7/02* (2013.01); *B60G 21/05* (2013.01);
(Continued)

(58) Field of Classification Search
CPC ... F16C 11/045; F16C 11/068; F16C 11/0666; F16C 33/74; F16C 33/66; F16C 23/045; F16C 2326/05; F16C 2226/60; F16C 33/723; F16C 33/1045; F16C 33/1065; F16C 17/26; B60G 3/14; B60G 7/02; B60G 21/05; B60G 2200/1442; B60G 2204/143; B60G 2204/418; B60G 2300/07; F16D 3/43
(Continued)

(56) References Cited

U.S. PATENT DOCUMENTS 2,631,044 A * 3/1953 Booth ................. B60G 7/005
280/124.108
2,974,986 A * 3/1961 Hazard .................. F16C 33/20
280/124.144

(Continued)

FOREIGN PATENT DOCUMENTS

GB 419562 A * 11/1934 ............. B60G 7/005
GB 934869 A * 8/1963 ............. B60G 7/005

(Continued)

*Primary Examiner* — Marcus Charles
(74) *Attorney, Agent, or Firm* — Shewchuk IP Services, LLC; Jeffrey D. Shewchuk

(57) ABSTRACT

A bearing device includes two co-axially arranged radial spherical bearings and can be used for mounting a pivoting swing arm of a vehicle suspension to a vehicle frame. By using the two radial spherical bearings together the pivot attachment only has a single degree of freedom. The radial spherical bearings are positioned against shoulders in a sleeve of the swing arm and around a spacer sleeve. One or more lubricant grooves are formed at the sliding interface of the bearings. A bushing with a lip holds a lubricant seal for each bearing, and a dust cover protects each lubricant seal. A pivot pin rod is inserted through openings in the vehicle frame and through the two bearings and other components, and is tightened in place such as with a nut.

18 Claims, 2 Drawing Sheets

(51) Int. Cl.
*F16D 3/43* (2006.01)
*B60G 3/14* (2006.01)
*B60G 21/05* (2006.01)
*F16C 33/66* (2006.01)
*F16C 11/06* (2006.01)
*F16C 33/10* (2006.01)
*B60G 7/02* (2006.01)
*F16C 17/26* (2006.01)
*F16C 23/04* (2006.01)

(52) U.S. Cl.
CPC .......... *F16C 11/0666* (2013.01); *F16C 17/26* (2013.01); *F16C 23/045* (2013.01); *F16C 33/1045* (2013.01); *F16C 33/1065* (2013.01); *F16C 33/66* (2013.01); *F16C 33/74* (2013.01); *F16D 3/43* (2013.01); *B60G 2200/1442* (2013.01); *B60G 2204/143* (2013.01); *B60G 2204/418* (2013.01); *B60G 2300/07* (2013.01); *F16C 2226/60* (2013.01); *F16C 2326/05* (2013.01)

(58) Field of Classification Search
USPC ....... 384/203, 205–206, 213, 291, 322, 316; 403/113, 122, 152; 280/124.1, 124.11, 280/847
See application file for complete search history.

(56) References Cited

U.S. PATENT DOCUMENTS

| | | | |
|---|---|---|---|
| 3,055,676 A * | 9/1962 | McCord | B60G 7/005 267/222 |
| 3,149,690 A | 9/1964 | Rosenkrands et al. | |
| 4,491,436 A | 1/1985 | Easton | |
| 5,249,334 A | 10/1993 | Horberg et al. | |
| 6,663,114 B2 * | 12/2003 | Lamela | B60G 17/005 180/305 |
| 6,733,019 B2 * | 5/2004 | Diener | B62D 7/16 280/93.51 |
| 6,851,688 B2 * | 2/2005 | Barry | B62D 7/16 280/93.51 |
| 6,851,691 B2 | 2/2005 | Rasidescu et al. | |
| 7,401,797 B2 | 7/2008 | Cho | |
| 8,746,719 B2 | 6/2014 | Safranski et al. | |
| 8,893,368 B2 | 11/2014 | Williams et al. | |
| 8,967,868 B2 * | 3/2015 | Wright | F16C 11/0642 384/208 |
| 9,365,251 B2 | 6/2016 | Safranski et al. | |
| 2009/0016808 A1 * | 1/2009 | Knoble | F16C 11/0614 403/61 |
| 2014/0210173 A1 * | 7/2014 | Conaway | B60G 5/04 280/86.5 |

FOREIGN PATENT DOCUMENTS

| | | | | |
|---|---|---|---|---|
| GB | 1242657 A * | 8/1971 | ............ | B60K 17/14 |
| GB | 1505925 A * | 4/1978 | ............ | B60G 7/005 |
| SU | 1579833 A1 * | 7/1990 | | |

* cited by examiner

BEARING FOR VEHICLE SUSPENSION

CROSS-REFERENCE TO RELATED U.S. APPLICATION(S)

None.

FIELD OF THE INVENTION

The present invention relates to suspension systems in vehicles, and particularly to bearing structures used in swing type rear suspensions used in offroad vehicles such as UVs and ATVs.

BACKGROUND OF THE INVENTION

Utility vehicles ("UVs") and all terrain vehicles ("ATVs") are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement. In general, such UVs and ATVs have a lower price point and are considerably smaller and simpler than on-road vehicles such as passenger automobiles and trucks. At the same time, the suspension systems in UVs and ATVs must be particularly robust to handle the extreme stresses when contacting offroad obstacles. To handle the rugged terrain, UVs and ATVs generally include greater suspension travel distances, particularly relative to size of the vehicle, than on-road vehicles.

One type of rear suspension known for use on UVs and ATVs may be referred to as a swing axle or swing arm suspension, in which a primary swing arm supporting the rear wheel extends longitudinally forward from the hub of the rear wheel, with the forward pivot point for the primary swing arm located in front of the rear wheel. Examples of swing arm suspensions, including their use on UVs and ATVs, are disclosed in U.S. Pat. Nos. 3,149,690, 6,851,691, 7,401,797, 8,746,719 and 9,365,251, and are further discussed in Applicant's copending U.S. patent application Ser. No. 15/825,662, each incorporated by reference.

The forward pivot point bearing of such rear swing suspensions must be able to withstand high loads for years or decades of use over very rough terrain between long or short periods of storage, including adverse weather and moisture conditions both when being driven and during storage. The forward pivot point bearing should allow accurate and reproducible travel of the rear wheel, both at the beginning and at the end of the vehicle life. The forward pivot point bearing should be simply manufactured and assemble, thereby reducing cost and difficulty in manufacturing the vehicle. The forward pivot point bearing should also facilitate disassembly and replacement in the event of damage. Current bearings in suspension systems often fail to adequately achieve such goals. Better bearings for vehicle suspensions, particularly suited for offroad vehicles such as UVs and ATVs, are needed.

BRIEF SUMMARY OF THE INVENTION

The present invention is a bearing device for mounting a pivoting swing arm of a vehicle suspension to a vehicle frame, as well as an assembly method for a suspension using the bearing device. In one aspect, the bearing device includes two co-axially arranged radial spherical bearings. While each radial spherical bearing by itself would permit three degrees of freedom, but using the two radial spherical bearings together the pivot attachment only has a single degree of freedom. The bearing device allows a simple assembly method including inserting a pivot pin rod through the two bearings and tightening in place such as with a nut. In another aspect, one or more lubricant grooves are formed at the sliding interface of the bearings so the bearing device is self lubricating over prolonged and rugged usage.

Figure 1:
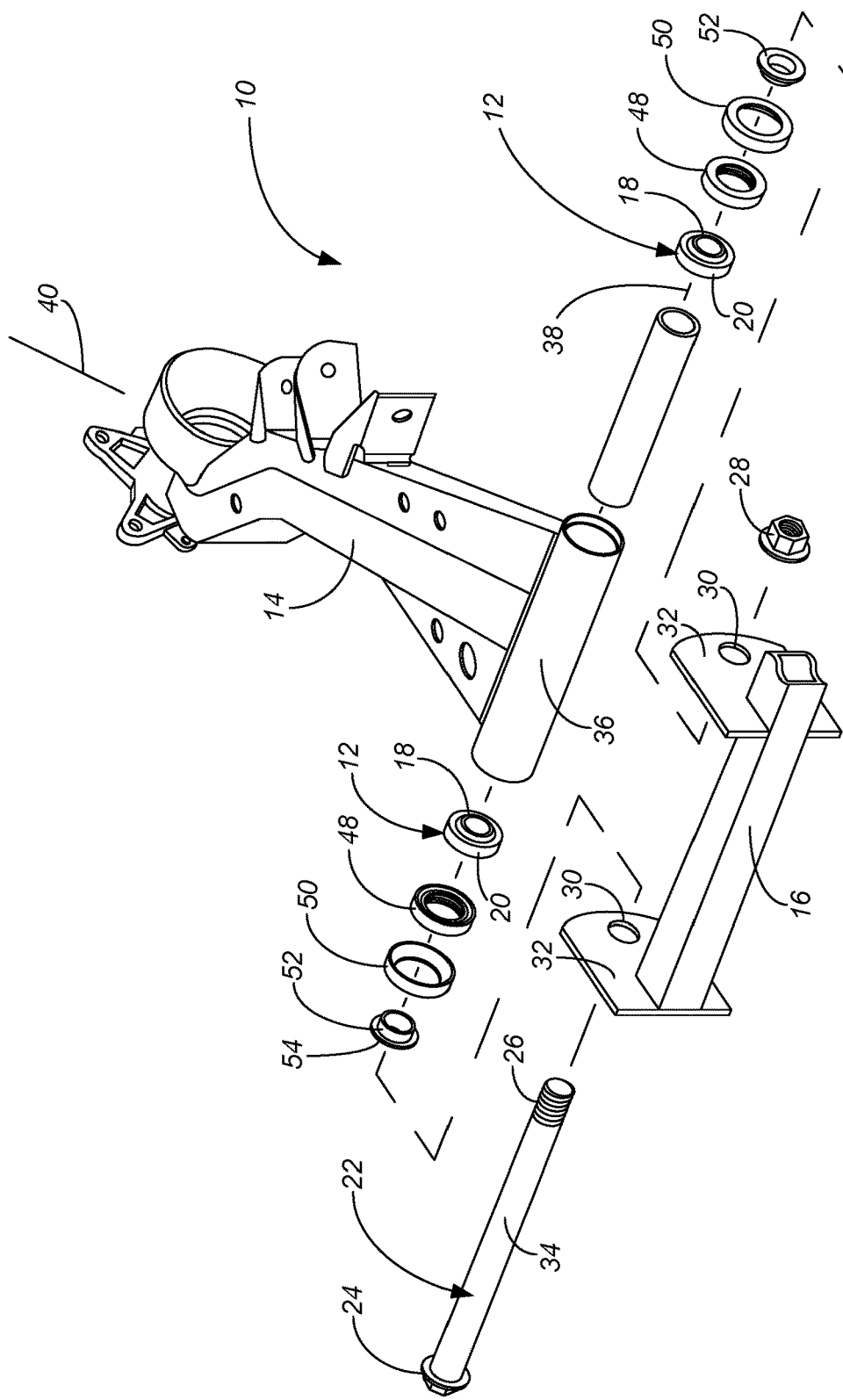
FIG. 1 is an exploded perspective view showing a first embodiment of a bearing assembly for a rear swing arm suspension of the present invention, for use in a passenger side rear wheel. In practice, the suspension system of the passenger side and driver side rear wheels are typically mirror images of one another, and the present invention is equally useful for either a passenger side swing arm or a driver side swing arm.

In these drawings, the reference numerals are as follows:
the bearing device 10,
radial spherical joint bearings 12,
the swing arm 14,
the frame 16,
ball swivel portion 18,
socket portion 20,
the pivot pin rod 22,
head 24,
threads 26,
the nut 28,
holes 30,
support plates 32,
pivot pin shaft 34,
sleeve 36,
pivot pin axis 38,
swing arm axis 40,
shoulders 42,
the spacer sleeve 44,
the lubricant grooves 46,
lubricant seals 48,
dust covers 50,
bushings 52, and
lip 54.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

In general terms, the bearing device 10 of the present invention uses two radial spherical joint bearings 12, sometimes referred to as rod end bearings or knuckle bearings, incorporated into the pivot connection between the front end of the swing arm 14 and the frame 16 (only a small portion of frame shown) of the vehicle in a suspension system for a rear wheel. Each radial spherical joint bearing 12 includes a ball swivel portion 18 having an outer surface which is spherical and a mating socket portion 20 with a spherical inner surface. The ball swivel portion 18 preferably has a cylindrical inner diameter for attachment to other components such as by press fitting onto a cylindrical rod. Alternatively, the ball swivel portion 18 may include a threaded recess (not shown) or rod extension (not shown) for attachment to other components (not shown). The socket portion 20 preferably has a cylindrical outer diameter for attachment to other components such as by press fitting into a cylindrical sleeve. Alternatively, the ball swivel portion 18 may include a threaded recess (not shown) or rod extension (not shown) for attachment to other components (not shown).

By itself, each radial spherical joint bearing 12 is a mechanical articulating joint which due to its ball-in-socket configuration allows three degrees of freedom of a link rigidly attached to the socket portion 20, i.e., allows up-and-down pivoting of the link about the sphere center point, allows as least some degree of side-to-side pivoting of the link about the sphere center point, and allows at least some degree of clockwise-counterclockwise rotation of the link about the link axis. Such radial spherical joint bearings are widely used—one at a time—in vehicle suspension systems on the ends of control rods, steering links, tie rods and similar components. Because of their suspension system usage, radial spherical joint bearings are designed to be very robust and sturdy in transmitting force across the movable connection, while maintaining precise positioning between the ball swivel portion 18 relative to the mating socket portion 20. Because radial spherical joint bearings are widely used, they are provided to the vehicle manufacturing market as high quality suspension components at a relatively low cost.

Instead of using a single radial spherical joint bearing between the swing arm 14 and the frame 16 of the vehicle, the preferred embodiment uses two radial spherical joint bearings 12. The two radial spherical joint bearings 12 are longitudinally spaced, with the cylindrical inner diameters of the two ball swivel portions 18 being coaxially aligned. In the preferred embodiment, the two radial spherical joint bearings 12 are press fit onto a pivot pin rod 22 in the shape of a common shoulder bolt. The pivot pin rod 22 has a structure to secure it in place, such as hexagonal head 24 on one end and external threads 26 on the other end to receive a hexagonal, internally-threaded nut 28. The pivot pin rod 22 is received through two aligned holes 30 on spaced support plates 32 (also called mounting plates) on the frame 16 of the vehicle and tightened in place with the nut 28. When tightened in place with appropriate tools such as wrenches (not shown), the pivot pin rod 22 and nut 28 rigidly fix the ball swivel portions 18 relative to the frame 16 of the vehicle.

The sizes of the pivot pin rod 22 and the radial spherical joint bearings 12, together with the materials used, determine how much stress and strain can be withstood by the bearing assembly 10. For use in UVs and ATVs, the pivot pin rod 22 can be formed of steel with the pivot pin shaft 34 having an outer diameter of at least 10 mm. In the most preferred embodiment, the pivot pin shaft 34 has an outer diameter of 20 mm, with the pivot pin rod 22 being formed of 40Cr alloy structural steel, heat treated by quenching and tempering to a hardness of 28-35 HRc. The ball swivel portions 18 of the preferred radial spherical joint bearings 12 are 16 mm wide, mating with a socket portion 20 which is 12 mm wide with an outer diameter of 35 mm. The ball swivel portions 18 are formed of GCr15 bearing steel heat treaded to a hardness of 60-65 HRc, and the socket portions 20 are formed of GCr15 bearing steel heat treaded to a hardness of 54~60 HRc. Other sizes and materials can alternatively be used to achieve the performance characteristics needed for the particular application.

The socket portions 20 are received in a cylindrical sleeve 36 welded or otherwise formed on the fore end of the swing arm 14, such as by press fitting the radial spherical joint bearings 12 into the two ends of the cylindrical sleeve 36, prior to assembly of the swing arm 14 to the frame 16 by press insertion of the pivot pin rod 22. By using two axially aligned radial spherical joint bearings 12 rather than one in connecting the fore end of the swing arm 14 to the vehicle frame 16, the two radial spherical joint bearings 12 provide a single degree of freedom, allowing the aft end of the swing arm 14 to pivot upwards and downwards about the pivot pin axis 38, but not allowing the aft end of the swing arm 14 to move from side to side and not allowing the swing arm 14 to rotate clockwise or counterclockwise about the swing arm axis 40. The most preferred swing arm sleeve 36 is formed of ASTM 1035 steel, quenched and tempered to a hardness of about 22-28 HRc, with the two ends machined (bored) to define the inner diameter which receives the press fitting of the socket portions 20 therein.

If desired, the two radial spherical joint bearings 12 may be positioned quite close to each other, such as with the two ball swivel portions 18 contacting each other. More preferably, the two radial spherical joint bearings 12 are separated on the pivot pin rod 22. In the preferred embodiment, this separation is achieved by machining two shoulders 42 on the swing arm sleeve 36 and with a spacer sleeve 44. Each socket portion 20 is pressed against its respective shoulder 42, and each ball swivel portion 18 pressed against an end of the spacer sleeve 44. The preferred spacer sleeve 44 has an inner diameter sized to receive the pivot pin shaft 34, and an outer diameter small enough that it doesn't interfere with the shoulders 42 of the swing arm sleeve 36. The preferred spacer sleeve 44 thus remains stationary with the pivot pin rod 22 and frame 16 of the vehicle during suspension pivoting of the swing arm 14. Alternatively, the spacer sleeve 44 could be received in the sleeve 36 the rear swing arm 14 and achieve spacing by abutting against each of the socket portions 20.

The length of the spacer sleeve 44/separation between the shoulders 42 determines the amount of separation between the two radial spherical joint bearings 12, which in turn effects the ability of the bearing device 10 to withstand side moments on the aft end of the swing arm 14 as the rear wheel of the vehicle is impacted from the side while riding over rough, uneven terrain. The length of the spacer sleeve 44/separation between the shoulders 42 also effects the required length of the pivot pin rod 22 and the required distance between the support plates 32 on the frame 16. While greater separation can more easily withstand side moments while minimizing side-to-side deflection, greater separation also requires more space in the vehicle. The preferred length of spacer sleeve 44/separation between the shoulders 42 is greater than 10 mm and less than 200 mm. In the most preferred embodiment, the spacer sleeve 44 is about 88 mm long, and the separation between the shoulders 42 is about 92 mm.

Figure 2:
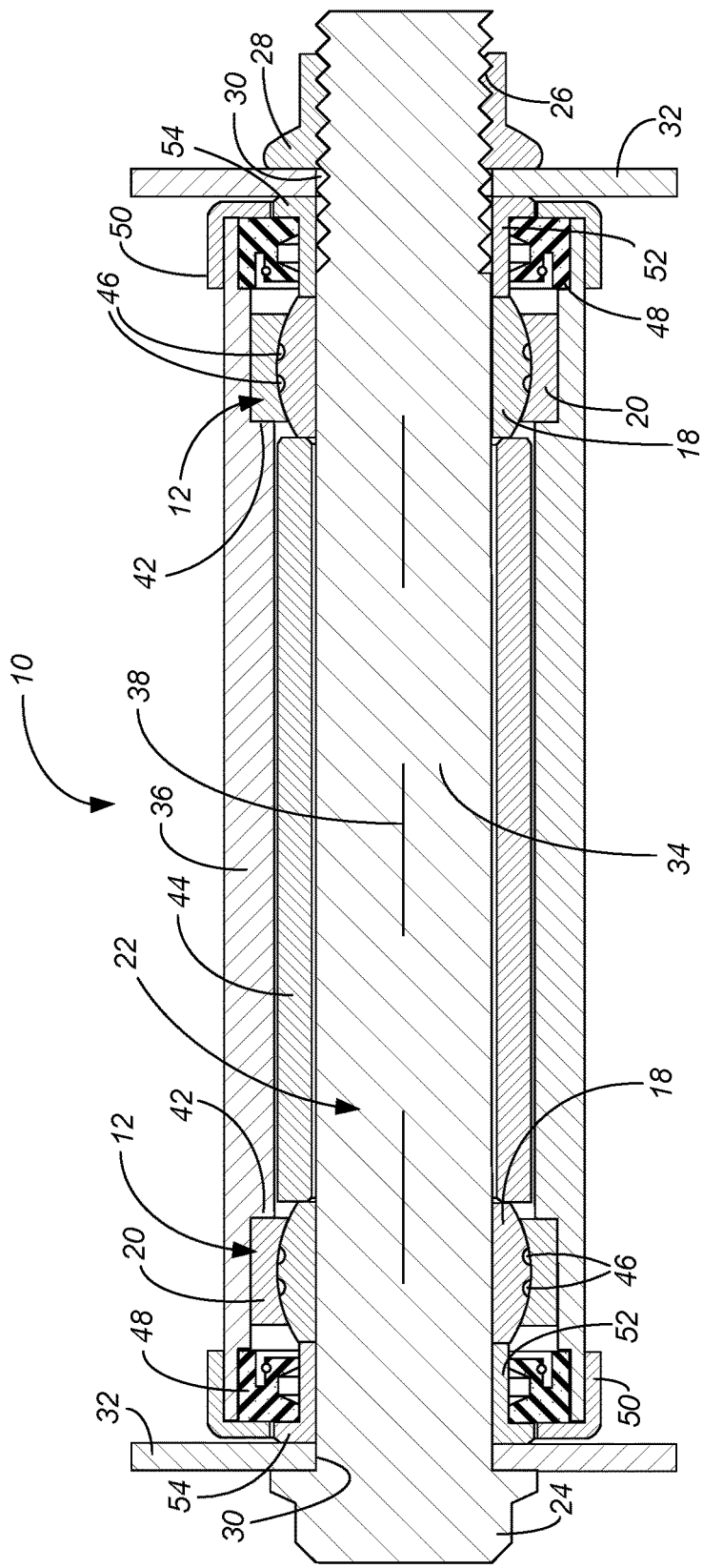
FIG. 2 is a cross-sectional view of the bearing assembly of FIG. 1 after assembly.

The preferred bearing device 10 also includes several components and features to help lubricate the radial spherical joint bearings 12. At least one, and more preferably two circumferential lubricant grooves 46 (shown in FIG. 2) are provided at the mating interface between the ball swivel portion 18 and the socket portion 20 of each radial spherical joint bearing 12. In the preferred embodiment, two circumferential lubricant grooves 46 are machined into the outer spherical surface of the ball swivel portion 18, well interior to the width of the socket portion 20. Note that, because when assembled only one degree of freedom remains to the bearing device 10, the lubricant grooves 46 will not be left exposed after assembly with the swing arm sleeve 36 and the pivot pin rod 22.

During the working process of the suspension (i.e., during driving the vehicle over rough terrain when the swing arm 14 pivots up and down), lubricant stored in the lubricant groove will always form a lubricant film on the sliding surface between the ball swivel portion 18 and the socket portion 20. The preferred lubricant is a molybdenum disulfide powder or an oil containing a molybdenum disulfide powder, with a fine powder size such as having most particles in the 1 to 10 micron range.

While the lubricant grooves 46 do a very good job of storing and retaining lubricant during use of the bearing device 10, lubricant retention is further achieved by including an lubricant seal 48 and a dust cover 50 on the exposed end of each radial spherical joint bearing 12. Both the lubricant seal 48 and the dust cover 50 are annular and are sized to mate with the ends of the sleeve 36, and pivot together with pivoting of the swing arm 14.

Bushings 52 are provided between the lubricant seal 48 and the pivot pin shaft 34, with the bushings 52 remaining stationary with the pivot pin rod 22 during use. The use of the bushings 52 and the spacer sleeve 44 helps to transmit the press force to the frame 16 when the pivot pin rod 22 is pressed into the radial spherical joint bearings 12. The use of the bushings 52 and the spacer sleeve 44, both abutting the width of the ball swivel portions 18, also places axially directed compression forces on the ball swivel portions 18 when the nut 28 is tightened onto the pivot pin rod 22. The compression forces on the ball swivel portions 18 help secure the ball swivel portions 18 to the pivot pin rod 22, so the press fitting of the ball swivel portions 18 onto the pivot pin shaft 34 during in situ assembly need not be so tight. The use of bushings 52 also provides a more controllable surface for minimizing friction and wear of the moving lubricant seal 48 relative to the stationary bushing 52. The most preferred bushings 52 are annular and have an L-shape in cross-section, providing a lip 54 to retain the lubricant seal 48 in place should the lubricant seal 48 wear during the life of the vehicle.

In the most preferred embodiment, the dust cover 50, the lubricant seal 48 and the bushing 52 are all sized to be received one in the other and in the machined ends of the swing arm sleeve 36. This allows the two dust covers 50, the two lubricant seals 48 and the two bushings 52 to be loosely assembled in place within the swing arm 14 after press fitting the radial spherical joint bearings 12 into place around the spacer sleeve 44. Then, that assembly 14/44/12s/48s/52s/50s is positioned between the two spaced support plates 32 of the vehicle frame 16, before being secured by insertion of the pivot pin rod 22 and tightening of the nut 28.

The lubricant structure of the present invention causes the radial spherical joint bearing 12 to be self-lubricating, such that no further greasing is usually required during the life of the vehicle. The lubricant structure extends the service life of the bearing device 10, reduces heat generated by friction and improves bearing capacity.

The bearing device 10 of the present invention is low cost and easy to assemble. Installation accuracy is very good. The bearing device 10 has excellent load-carrying capability for both radial and axial loads. Testing indicates that under normal operating conditions, the bearing device 10 of the present invention be used maintenance-free for more than one hundred thousand kilometers of ATV or UV travel, and the swing arm 14 of the rear suspension can swing more than 700 million times.

Although the present invention has been described with reference to preferred embodiments, workers skilled in the art will recognize that changes may be made in form and detail without departing from the spirit and scope of the invention. As one example, while the preferred embodiment uses a sleeve 36 on the swing arm 14 and two support plates 32 on the vehicle frame 16, it would be simple to reverse this construction, placing plates on the fore end of the swing arm and rigidly attaching the sleeve to the vehicle frame.

The invention claimed is:

1. A bearing device for mounting a pivoting swing arm of a vehicle suspension to a vehicle frame, the bearing device comprising:
   a first radial spherical bearing and a second radial spherical bearing, each of the first and second radial spherical bearings having a ball swivel portion mating with a socket portion, the outer surface of the ball swivel portion defining a portion of a sphere having a sphere center, with the sphere centers of the first and second radial spherical bearings defining a pivot axis;
   a portion of a vehicle frame rigidly secured to the ball swivel portion of each of the first and second radial spherical bearings; and
   a swing arm rigidly secured to the socket portion of each of the first and second radial spherical bearings;
   such that the swing arm can pivot about the pivot axis with a single degree of freedom,
   wherein the swing arm comprises a swing arm sleeve with ends, each end having a shoulder defined on an inside diameter of the swing arm sleeve, with the socket portions of the first and second radial spherical bearings press fitted into the ends of the swing arm sleeve in abutment with one of the shoulders, such that shoulders define spacing longitudinally separating the first radial spherical bearing from the second radial spherical bearing.

2. The bearing device of claim 1, wherein the portion of the vehicle frame comprises a first mounting plate spaced from a second mounting plate, the first and second radial spherical bearings connected to the first mounting plate and the second plate by a pivot pin rod attached to the first mounting plate and the second mounting plate and extending through the ball swivel portions of the first and second radial spherical bearings.

3. The bearing device of claim 2, wherein the first and second radial spherical bearings are both positioned between the first mounting plate and the second mounting plate.

4. The bearing device of claim 2, wherein each of the first mounting plate and the second mounting plate having an opening therethrough, with the pivot pin rod comprising a head and threads, and with the pivot pin rod extending through the openings and secured to the first mounting plate and the second mounting plate by tightening a nut onto the threads.

5. The bearing device of claim 1, further comprising a spacer sleeve longitudinally spacing the first radial spherical bearing from the second radial spherical bearing.

6. The bearing device of claim 1, wherein one of the ball swivel portion or the socket portion of each of the first and second radial spherical bearing comprises a lubricant groove.

7. The bearing device of claim 6, wherein the lubricant groove extends circumferentially on the ball swivel portion of each of the first and second radial spherical bearings, and, after assembly of the first and second radial spherical bearing relative to the portion of the vehicle frame and the swing arm, the socket portion covers the lubricant groove.

8. A bearing device for mounting a pivoting swing arm of a vehicle suspension to a vehicle frame, the bearing device comprising:
a first radial spherical bearing and a second radial spherical bearing, each of the first and second radial spherical bearings having a ball swivel portion mating with a socket portion, the outer surface of the ball swivel portion defining a portion of a sphere having a sphere center, with the sphere centers of the first and second radial spherical bearings defining a pivot axis;
a portion of a vehicle frame rigidly secured to one of the ball swivel portion and the socket portion of each of the first and second radial spherical bearings; and
a swing arm rigidly secured to the other of the ball swivel portion and the socket portion of each of the first and second radial spherical bearings;
such that the swing arm can pivot about the pivot axis with a single degree of freedom, and further comprising:
a sleeve containing the first and second radial spherical bearings, the sleeve having first and second ends;
a first annular lubricant seal for the first radial spherical bearing on the first end of the sleeve, the first lubricant seal being fixed relative to the sleeve;
a first L-shaped annular bushing opposing the first lubricant seal, the L-shape of the first bushing retaining the first lubricant seal, the first bushing moving relative to the sleeve during pivoting of the swing arm about the pivot axis;
a second annular lubricant seal for the second radial spherical bearing on the second end of the sleeve, the second lubricant seal being fixed relative to the sleeve; and
a second L-shaped annular bushing opposing the second lubricant seal, the L-shape of the second bushing retaining the second lubricant seal, the second bushing moving relative to the sleeve during pivoting of the swing arm about the pivot axis.

9. The bearing device of claim 8, further comprising a first dust cover covering the first lubricant seal and a second dust cover covering the second lubricant seal.

10. A method of assembling a vehicle suspension, comprising:
attaching a first bearing on a first end of a sleeve, wherein the first end of the sleeve comprises a first shoulder on its inner diameter, with the first bearing being pressed into the first end of the sleeve into abutment with the first shoulder;
attaching a second bearing on a second end of a sleeve, wherein the second end of the sleeve comprises a second shoulder on its inner diameter, the second shoulder being longitudinally spaced in the sleeve from the first shoulder, with the second bearing being pressed into the second end of the sleeve into abutment with the second shoulder, such that the first bearing and the second bearing are coaxially arranged to define a pivot axis;
positioning the sleeve between a first and a second mounting plate, the first mounting plate and the second mounting plate being fixed relative to each other, each mounting plate having an pivot pin opening defined therein;
inserting a pivot pin rod through the pivot pin opening of the first mounting plate, through the first bearing, through the sleeve, through the second bearing and through the pivot pin opening of the second mounting plate; and
securing the pivot pin rod such that it is fixed relative to the first and second mounting plates;
such that the sleeve can pivot relative to the first and second mounting plates about the pivot axis with a single degree of freedom.

11. The method of claim 10, wherein the first and second bearings are each radial spherical bearings, each of the first and second radial spherical bearings comprising a ball swivel portion mating with a socket portion, the outer surface of the ball swivel portion defining a portion of a sphere having a sphere center, with the sphere centers of the first and second radial spherical bearings being on the pivot axis, the pivot pin rod extending through the ball swivel portions of the first and second radial spherical bearings.

12. The method of claim 11, wherein at least one circumferential lubricant groove is formed on the ball swivel portion of each of the first and second radial spherical bearings, and, after inserting the pivot pin rod through the first and second radial spherical bearings, the socket portion of the first radial spherical bearing covers the lubricant groove on the ball swivel portion of the first radial spherical bearing, and the socket portion of the second radial spherical bearing covers the lubricant groove on the ball swivel portion of the second radial spherical bearing.

13. The method of claim 10, further comprising, prior to positioning the sleeve between a first and a second mounting plate, placing a first lubricant seal, a first bushing and a first dust cover on the first end of the sleeve, and placing a second lubricant seal, a second bushing and a second dust cover on the second end of the sleeve, each of the first bushing, the first dust cover, the first lubricant seal, the second lubricant seal, the second dust cover and the second bushing are annular, and wherein the pivot pin rod is inserted through the first bushing, the first dust cover, the first lubricant seal, the second lubricant seal, the second dust cover and the second bushing.

14. The method of claim 10, further comprising positioning a spacer within the sleeve prior to pressing the second bearing into the second end of the sleeve.

15. The method of claim 10, wherein the pivot pin rod comprises a head and threads, and wherein securing the pivot pin rod comprises tightening a nut onto the threads.

16. A method of assembling a vehicle suspension, comprising:
attaching a first bearing on a first end of a sleeve;
attaching a second bearing on a second end of a sleeve, such that the first bearing and the second bearing are coaxially arranged to define a pivot axis;
positioning the sleeve between a first and a second mounting plate, the first mounting plate and the second mounting plate being fixed relative to each other, each mounting plate having an pivot pin opening defined therein;
inserting a pivot pin rod through the pivot pin opening of the first mounting plate, through the first bearing, through the sleeve, through the second bearing and through the pivot pin opening of the second mounting plate; and
securing the pivot pin rod such that it is fixed relative to the first and second mounting plates;
such that the sleeve can pivot relative to the first and second mounting plates about the pivot axis with a single degree of freedom, wherein the sleeve is rigidly attached to a swing arm of a rear wheel suspension, and wherein the first and second mounting plates are rigidly secured to the frame of the vehicle.

17. A rear swing arm pivot assembly for a rear wheel vehicle suspension, comprising:
- a first mounting plate and a second mounting plate rigidly disposed relative to each other, the first mounting plate having a first pivot pin opening, the second mounting plate having a second pivot pin opening;
- a sleeve positioned between the first and second mounting plates, the sleeve having a first end and an opposing second end, one of the sleeve or the mounting plates rigidly secured to a rear swing arm of a rear wheel suspension, the other of the sleeve or the mounting plates rigidly secured to the frame of a vehicle;
- a first bearing on the first end of the sleeve;
- a second bearing on the second end of the sleeve, such that the first bearing and the second bearing are coaxially disposed so as to define a pivot axis; and
- a pivot pin rod extending through the pivot pin opening of the first mounting plate, through the first bearing, through the sleeve, through the second bearing and through the pivot pin opening of the second mounting plate such that the rear swing arm can pivot relative to the frame of the vehicle about the pivot axis with a single degree of freedom.

18. The rear swing arm pivot assembly of claim 17, further comprising:
- a spacer positioned within the sleeve between the first bearing and the second bearing;
- a first bushing on the pivot pin rod, between the first mounting plate and the first bearing, the first bushing remaining fixed relative to the pivot pin rod during pivoting of the rear swing arm;
- a first lubricant seal and a first dust cover on the first end of the sleeve, the first lubricant seal and the first dust cover remaining fixed relative to the sleeve during pivoting of the rear swing arm;
- a second lubricant seal and a second dust cover on the second end of the sleeve, the second lubricant seal and the second dust cover remaining fixed relative to the sleeve during pivoting of the rear swing arm; and
- a second bushing on the pivot pin rod, between the second bearing and the second mounting plate, the second bushing remaining fixed relative to the pivot pin rod during pivoting of the rear swing arm.

* * * * *